United States Patent [19]

van Eijk

[11] 4,176,043
[45] Nov. 27, 1979

[54] PROCESS FOR PREPARING BINDER PITCHES

[75] Inventor: Johannes N. van Eijk, Uithoorn, Netherlands

[73] Assignee: Cindu Chemie B.V., Uithoorn, Netherlands

[21] Appl. No.: 808,175

[22] Filed: Jun. 20, 1977

[30] Foreign Application Priority Data

Jun. 23, 1976 [NL] Netherlands ......................... 7606820

[51] Int. Cl.² ........................... C10C 1/16; C10C 3/02
[52] U.S. Cl. ....................................... 208/44; 208/22; 208/6
[58] Field of Search ................................ 208/22, 44, 6

[56] References Cited

U.S. PATENT DOCUMENTS

| | | |
|---|---|---|
| 2,348,832 | 5/1944 | Mauch et al. |
| 3,970,542 | 7/1976 | Bongertman .......................... 208/44 |

*Primary Examiner*—Veronica O'Keefe
*Attorney, Agent, or Firm*—Burgess, Ryan and Wayne

[57] ABSTRACT

A process for preparing a binder pitch, in which a high-aromatic residual fraction from petroleum raw materials is mixed with a coal tar fraction in weight ratios of about 1:9 to 9:1 and heated, while during heating the mixture is kept in contact with a dehydrogenating agent, in particular an oxygen-containing gas.

11 Claims, No Drawings

PROCESS FOR PREPARING BINDER PITCHES

The invention relates to a process for preparing binder pitches, in which a high-aromatic residual fraction from petroleum raw materials is mixed with a coal tar fraction in a weight ratio of about 1:9 to 9:1 and heated.

A similar process is known from Dutch application No. 71,12518. In the process disclosed therein a cracking oil residue is mixed with coal tar pitch, after which this mixture is subjected to a heat treatment at temperatures above 350° C. The cracking oil residue to be used in the known process has a softening point of more than 60° C., while the coal tar pitch to be used has a softening point of more than 80° C.

According to the invention, during heating the mixture is kept in contact with a dehydrogenating agent.

The process according to the invention has a number of important advantages over the prior art process.

In the first place, the number of starting materials to be used is greater because not only a coal tar pitch but also coal tar oils can be used as starting materials. Not only high-aromatic residual fractions having a softening point of more than 60° C. can be used as the petroleum raw material but also oil obtained by distillation of the higher boiling fractions from a partially gas oil-fed cracking installation having a boiling range of 300°-400° C. The said oils cannot be used in the prior art process.

A further advantage of the process according to the invention is that the pitches are obtained in a particularly high yield. Also the content of so-called $C_2$-resins, that is to say of those substances which are insoluble in toluene but soluble in anthracene oil, which for the quality of binder pitches is an important measure, is surprisingly high.

It is observed that in German Auslegeschrift No. 1,086,617 there is disclosed a process by means of which a homogeneous mixture of a petroleum residue and a tar product can be prepared by having the mixing take place at a temperature of about 375° C. According to the method described therein, paraffinic petroleum residues, i.e. bitumen, are rendered miscible with coal tar residues. Without this treatment these materials show de-mixing. The mixture to be converted according to the invention, which consists of an aromatic residue of petrochemical origin and a coal tar residue, is stable by itself so that both the object of the process according to the invention—the preparation of a binder pitch—and the raw materials to be used therein differ from those as described in German Auslegeschrift No. 1,086,617.

In carrying out the process according to the invention the dehydrogenation of the mixture may be effected in a number of ways. Preferably, an oxygen-containing gas, e.g. air, is passed through the mixture. For example, the passing of air takes place in an amount of 20-500 liters/hour/kg. mixture. Preferably, 200-400 liters/hour/kg. are passed through. There may also be used another dehydrogenation gas, e.g. chlorine gas. Preferably, this gas is passed through the mixture in an amount of 40-80 liters/hour/kg. mixture.

Furthermore there may be added to the mixture, for example, previous to or during heating sulphur, preferably in an amount of 2-20 g sulphur per kg. mixture.

The weight ratios of the separate components in the mixture are variable within wide limits, e.g. from 1:9 to 9:1. Preferably, there are used mixing ratios of from 1:5 to 5:1.

According to the invention there may be used as the coal tar residue, for example, coal tar pitch having a softening point of e.g. 80° C. (ring and ball) but also, for example, heavy anthracene oil, a tar oil having a boiling point of more than 350° C.

As petroleum raw material there may be used, for example, a pitch obtained by distillation of an aromatic residue from a naphtha-fed cracking installation having a softening range (ring and ball) of 50°-80° C. Also there may be used a pitch which is obtained by distillation of an aromatic residue from a (partially) gas oil-fed cracking installation having a softening point (ring and ball) of 50°-80° C. Furthermore, there may be used an oil having a boiling range of 300°-400° C., for example, obtained by distillation of the higher boiling fraction from a (partially) gas oil-fed cracking installation.

These starting materials are all known per se and are described, for example, in Riediger: "Die Verarbeitung des Erdöles", 1971; Franck und Collin "Steinkohlteer", 1963; Kirk Othmer, 2nd Ed., Vol. 2.

For carrying out the process according to the invention, a reactor may be used which is known per se. Such reactors are described, for example, in "Erdöl-Erdgas-Zeitschrift", 85, 1969, p.414 ff., for the oxidation of asphalt bitumen. The reactor described herein is used, for example, for the treatment of a petroleum residue, a product of the distillation of crude petroleum as described in U.S. Pat. No. 2,348,832. Therefore, also here both the object and the raw material to be used completely differ from those according to the invention.

Upon application of the process according to the invention the mixture is preferably heated to a temperature of 300°-350° C. In general the heating is effected unitl there is obtained a pitch having a softening point (ring and ball of 50°-200° C., a $C_2$-resin content of at least 15% (calculated on normal conditions), and a coke number of at least 40% (also calculated on normal conditions).

The binder pitch obtained upon application of the process according to the invention is suitable for a great number of purposes. It may be used as a binder pitch, such as electrode pitch, as a binder pitch for coke, e.g. form coke, as a binder for refractive materials, road building materials, etc.

Furthermore the binder pitches obtained according to the invention are suitable as so-called carbon precursors, such as impregnation pitches for electrodes, as carbon refining pitches, as pitch for active carbon and pitch for carbon fibers, etc.

The invention will be further explained with reference to the following examples.

In each example is given the actual test result, and this is compared with the average of the separate values of the tests with the separate raw materials. It clearly appears that relative to the latter value there is obtained a surprising increase of the $C_2$-resin content and/or of the preparation yield.

It is observed that the examples show that only from coal tar pitch a suitable binder pitch can be obtained. However, the industrial availability of coal tar pitch is limited relative to petroleum residues.

In carrying out the process according to the examples the following components were used in a weight ratio as indicated in the examples:

(A) coal tar pitch having a softening point (ring and ball) of 80° C.

(B) heavy anthracene oil, a tar oil having an initial boiling point of more than 350° C.
(C) a pitch obtained by distillation of an aromatic residue from a naphtha-fed cracking installation having a softening point (ring and ball) of 65° C.
(D) a pitch obtained by distillation of an aromatic residue from a (partially) gas oil-fed cracking installation having a softening point (ring and ball) of 80° C.
(E) an oil having a boiling point of 300°–400° C., obtained by distillation of a (partially) gas oil-fed cracking installation.
(F) residue from a catalytic cracking installation (FCC installation).

The tests were carried out in such a manner that they were stopped when a predetermined softening point was attained. For the mixtures containing coal tar pitch this was about 100° C., and for the mixtures containing heavy anthracene oil about 85° C. The physical properties of the pitch were subsequently examined each time.

EXAMPLE I 500 g (A) and (C) were brought in a weight ratio of 1:1 into a glass flask having a content of 1 liter. The flask was provided with a dip tube having at its end some small openings and being connected to an air cylinder. Furthermore the flask was provided with an air cooler serving to condense evaporating high-boiling components and to recycle same to the flask. The temperature in the flash was measured by means of a thermocouple. The flask was placed in a heating jacket, the heat supply being controlled by means of a control resistor.

The temperature inside the flask was increased to 300° C., after which the passing of air was started. The amount of air passed was 150 liters/hour. During the tests the temperature increased to 350° C. owing to liberated reaction heat. When a softening point of 100° C. was attained, the test was stopped. The resultant pitch was examined as to its physical properties, and the values found were compared with the average of the separate values of the tests with the separate raw materials (calculated). (comparative example II and III). The results are as follows:

|  | Acutal | Calculated |
| --- | --- | --- |
| Softening point (ring and ball) | 100° C. | 100° C. |
| Content $C_1$-resins | 3% | 3% |
| Content $C_2$-resins | 20% | 13% |
| Coke number | 53% | 50% |
| Yield | 95% | 97% |

COMPARATIVE EXAMPLE II

Example I was repeated, but now, instead of a mixture of (A) and (C), 500 g coal tar pitch (A) was used. The results obtained are as follows:

| Softening point (ring and ball) | 100° C. |
| --- | --- |
| Content $C_1$-resins | 5% |
| Content $C_2$-resins | 15% |
| Coke number | 54% |
| Yield | 98% |

COMPARATIVE EXAMPLE III

Example I was repeated, but now instead of a mixture of (A) and (C), 500 g of a naphtha pitch (C) was used. The results obtained are as follows:

| Softening point (ring and ball) | 100° C. |
| --- | --- |
| Content $C_1$-resins | 0% |
| Content $C_2$-resins | 12% |
| Coke number | 45% |
| Yield | 97% |

EXAMPLE IV

Example I was repeated, but now a mixture of (A) and (D) was used. The results obtained were as follows:

|  | Actual | Calculated |
| --- | --- | --- |
| Softening point (ring and ball) | 100° C. | 100° C. |
| Content $C_1$-resins | 3% | 3% |
| Content $C_2$-resins | 19% | 14% |
| Coke number | 52% | 52% |
| Yield | 99% | 95% |

COMPARATIVE EXAMPLE V

Example IV was repeated, but now instead of a mixture of (A) and (D), 500 g of a gas oil pitch (D) was used. The results obtained are as follows:

| Softening point (ring and ball) | 100° C. |
| --- | --- |
| Content $C_1$-resins | 0% |
| Content $C_2$-resins | 14% |
| Coke number | 49% |
| Yield | 92% |

EXAMPLE VI

Example I was repeated, but now a mixture of (A) and (E) was used. The results were as follows:

|  | Actual | Calculated |
| --- | --- | --- |
| Softening point (ring and ball) | 100° C. | 100° C. |
| Content $C_1$-resins | 5% | 3% |
| Content $C_2$-resins | 25% | 20% |
| Coke number | 51% | 49% |
| Yield | 90% | 79% |

COMPARATIVE EXAMPLE VII

Example VI was repeated, but now, instead of a mixture of (A) and (E), 500 g of a gas oil (E) was used. The results obtained are as follows:

| Softening point (ring and ball) | 100° C. |
| --- | --- |
| Content $C_1$-resins | 0% |
| Content $C_2$-resins | 25% |
| Coke number | 44% |
| Yield | 60% |

EXAMPLE VIII

Example I was repeated, but now a mixture of (A) and (F) was used. The results obtained were as follows:

|  | Actual | Calculated |
| --- | --- | --- |
| Softening point (ring and ball) | 100° C. | 100° C. |
| Content $C_1$-resins | 4% | 3% |
| Content $C_2$-resins | 21% | 18% |

|  | Actual | Calculated |
|---|---|---|
| Coke number | 48% | 47% |
| Yield | 95% | 87% |

COMPARATIVE EXAMPLE IX

Example VIII was repeated, but now instead of a mixture of (A) and (F), 500 g of a FCC residue (F) was used. The results obtained are as follows:

| Softening point (ring and ball) | 100° C. |
|---|---|
| Content $C_1$-resins | 0% |
| Content $C_2$-resins | 22% |
| Coke number | 40% |
| Yield | 75% |

EXAMPLE X

Example VI was repeated, but now instead of a mixing ratio of (A):(E) of 1:1, a ratio of 1:3 was used. The results obtained were as follows:

|  | Actual | Calculated |
|---|---|---|
| Softening point (ring and ball) | 100° C. | 100° C. |
| Content $C_1$-resins | 2% | 1% |
| Content $C_2$-resins | 27% | 22% |
| Coke number | 48% | 46% |
| Yield | 85% | 70% |

EXAMPLE XI

Example I was repeated, but now 500 g of a mixture of (B) and (D) in a ratio of 1:1 was used, while it was heated to a softening point of 85° C. The results obtained were as follows:

|  | Actual | Calculated |
|---|---|---|
| Softening point (ring and ball) | 85° C. | 85° C. |
| Content $C_1$-resins | 0% | 0% |
| Content $C_2$-resins | 24% | 19% |
| Coke number | 42% | 41% |
| Yield | 97% | 93% |

COMPARATIVE EXAMPLE XII

Example XI was repeated, but now instead of a mixture of (B) and (D), 500 g anthracene oil (B) was used. The results were as follows:

| Softening point (ring and ball) | 85° C. |
|---|---|
| Content $C_1$-resins | 0% |
| Content $C_2$-resins | 27% |
| Coke number | 36% |
| Yield | 95% |

EXAMPLE XIII

Example XI was repeated, but now a mixture of (B) and (E) was used. The results obtained were as follows:

|  | Actual | Calculated |
|---|---|---|
| Softening point (ring and ball) | 85° C. | 85° C. |
| Content $C_1$-resins | 0% | 0% |
| Content $C_2$-resins | 22% | 23% |
| Coke number | 43% | 38% |
| Yield | 94% | 77% |

EXAMPLE XIV

Example XI was repeated, but now, instead of a mixture of (B) and (D) in a weight ratio of 1:1, 500 g (B) and (D) in a weight ratio of 4:1 was used. The results obtained were as follows:

|  | Actual | Calculated |
|---|---|---|
| Softening point (ring and ball) | 100° C. | 100° C. |
| Content $C_1$-resins | 0% | 0% |
| Content $C_2$-resins | 27% | 24% |
| Coke number | 40% | 39% |
| Yield | 97% | 94% |

EXAMPLE XV 500 g of a mixture of (A) and (D) were brought in a weight ratio of 1:1 into the flask as defined in Example I, which, however, now was connected to a cylinder of chlorine gas. After the temperature in the flask had been increased to 300° C., chlorine gas was passed through in an amount of 30 liter/hour. THe heating and passing through of chlorine gas was continued until the softening point of the resultant pitch had become 100° C. Analysis of the resultant substance gave the following results:

| Softening point (ring and ball) | 100° C. |
|---|---|
| Content $C_1$-resins | 3% |
| Content $C_2$-resins | 21% |
| Coke number | 53% |
| Yield | 98% |

Comparative tests with the separate substances gave results which correspond to those obtained with passing air through the separate substances.

EXAMPLE XVI 500 g of (A) and (C) were brought in a weight ratio of 1:1 together with 5 g. sulphur flour into a glass flask having a content of 1 liter. By means of a heating jacket the temperature was increased to 300° C., while the mixture was stirred. After the softening point of the resultant substance had become 100° C., it was cooled. Analysis of the resultant substance gave the following results:

| Softening point (ring and ball) | 100° C. |
|---|---|
| Content $C_1$-resins | 3% |
| Content $C_2$-resins | 23% |
| Coke number | 51% |
| Yield | 98% |

Comparative tests with the separate substances gave the following results:

|  | Raw material (A) (found) | Raw material (C) (found) | Average (Calculated) |
|---|---|---|---|
| Softening point | 100° C. | 100° C. | 100° C. |

-continued

|  | Raw material (A) (found) | Raw material (C) (found) | Average (Calculated) |
|---|---|---|---|
| Content $C_1$-resins | 8% | 0% | 4% |
| Content $C_2$-resins | 24% | 14% | 19% |
| Coke number | 56% | 43% | 49% |
| Yield | 97% | 97% | 97% |

I claim:

1. A process for preparing a binder pitch which comprises: intimately contacting a mixture, with a weight ratio of from 9:1 to 1:9, of a petroleum residual fraction selected from the group consisting of high aromatic residue pitch having a ring and ball softening point of 50° to 80° C. and oil cracking residual oil having a boiling range of about 300° to 400° C. and a coal tar fraction selected from the group consisting of coal tar pitch having a ring and ball softening point of at least 80° C. and tar oil having an initial boiling point above 350° C. at a temperature above 300° C. with a dehydrogenating agent selected from the group consisting of oxygen, chlorine and sulfur for a sufficient length of time to form a binder pitch having a ring and ball softening point of 50° to 200° C., a $C_2$ resin content of at least 15% and a coke number of at least 40%.

2. The process of claim 1 wherein said dehydrogenating agent is an oxygen containing gas.

3. The process of claim 2 wherein the oxygen containing gas is air.

4. The process of claim 3 wherein the heated mixture is contacted with air at a rate of about 20 and 500 liters/hour/kg.

5. The process of claim 1 wherein the dehydrogenating agent is a chlorine containing gas.

6. The process of claim 5 wherein the heated mixture is contacted with chlorine gas at a rate of about 40 to 80 liters/hour/kg.

7. The process of claim 1 wherein the dehydrogenating agent is sulfur.

8. The process of claim 7 wherein sulfur in an amount of from about 2 to 20 grams/kg is added to said mixture before or during heating.

9. The process of claim 1 wherein the mixture is intimately contacted with the dehydrogenating agent at from about 300° to 350° C.

10. The process of claim 4 wherein the air rate is 200 to 400 liters/hours/kg.

11. The process of claim 1 wherein the weight ratio of said high aromatic residual fraction to said coal tar fraction is from about 1:5 to 5:1.

* * * * *